United States Patent
Yanase

(10) Patent No.: US 7,333,008 B2
(45) Date of Patent: Feb. 19, 2008

(54) TIRE DEFLATION WARNING SYSTEM AND METHOD THEREOF, AND JUDGMENT PROGRAM OF TIRE WITH REDUCED PRESSURES

(75) Inventor: Minao Yanase, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 168 days.

(21) Appl. No.: 11/157,847

(22) Filed: Jun. 22, 2005

(65) Prior Publication Data

US 2006/0006014 A1    Jan. 12, 2006

(30) Foreign Application Priority Data

Jul. 12, 2004  (JP) .............................. 2004-204427

(51) Int. Cl.
*B60C 23/00* (2006.01)

(52) U.S. Cl. ...................... 340/444; 340/441; 340/442; 340/445; 340/446; 340/447; 73/146; 73/146.2; 116/34 R

(58) Field of Classification Search ................ 340/441, 340/442, 444, 445, 446, 447; 73/146, 146.2, 73/146.3, 146.5; 116/34 R; 180/197; 701/28, 701/29
See application file for complete search history.

(56) References Cited

U.S. PATENT DOCUMENTS 5,569,848 A * 10/1996 Sharp ........................ 73/146.2
6,222,444 B1 * 4/2001 Wang ......................... 340/442
6,809,637 B1 * 10/2004 Brown ........................ 340/443

FOREIGN PATENT DOCUMENTS

| JP | 2003-220811 A | 8/2003 |
| JP | 2003-267012A | 9/2003 |
| JP | 2003-291616 A | 10/2003 |
| JP | 2003-326927 A | 11/2003 |
| JP | 2004-17717 A | 1/2004 |

* cited by examiner

*Primary Examiner*—Hung Nguyen
(74) *Attorney, Agent, or Firm*—Birch, Stewart, Kolasch & Birch, LLP

(57) ABSTRACT

A tire deflation warning system having a means for detecting the rotational speeds of wheels on a vehicle and a means for judging tires with reduced air pressure from the rotational speed information of the wheels including a means for judging whether driving force works to respective wheels or not a means for calculating a vehicle speed when driving force works to respective wheels, a means for comparing the average of the rotational speeds of the driving wheels against the average of the rotational speeds of the following wheels, with the average of the rotational speeds of the driving wheels against the average of the rotational speeds of the following wheels at normal air pressure in running state in which the vehicle has driving force and a means for judging that the air pressures of the all wheels which are mounted on the vehicle are simultaneously reduced, or that the air pressures of the driving wheels are reduced by the result of the comparison.

6 Claims, 5 Drawing Sheets

TIRE DEFLATION WARNING SYSTEM AND METHOD THEREOF, AND JUDGMENT PROGRAM OF TIRE WITH REDUCED PRESSURES

BACKGROUND OF THE INVENTION

The present invention relates to a device for detecting respective tires with reduced air pressure on a vehicle. More specifically, the present invention relates to a tire deflation warning system which reliably carries out the judgment of tires with reduced air pressure when the air pressures of the all wheels are simultaneously reduced.

The air pressures of tires are gradually lowered even if tires are not damaged. Simultaneous reduced pressures occasionally occur because air permeates the rubber of tires in addition to the dimension growth of new tires and the simultaneous reduced pressure caused by the lowering of atmospheric temperature. It happens to be dangerous that a vehicle runs while being in reduced pressure, and since fuel cost is deteriorated, influence to environment is also concerned.

Accordingly, there have been proposed methods for detecting simultaneous deflation of 4 wheels in addition to the detection of deflation of one wheel.

For example, there is a method for detecting the simultaneous deflation of 4 wheels utilizing the difference of load sensitivity, from the inclination of relation between the judging value (DEL value) of reduced pressure by the difference of sum of 2 pairs of the rotational speeds of wheels which are situated at diagonal to a vehicle and acceleration to a lateral direction (lateral G), and from the value of a yaw rate sensor and the rotational speed ratio of left and right wheels.

For example, additionally, there is a method for detecting the simultaneous deflation of 2 driving wheels utilizing the change of frictional coefficient—slipping coefficient ($\mu$-s) property (Japanese Unexamined Patent Publication No. 17717/2004, Japanese Unexamined Patent Publication No. 291616/2003, Japanese Unexamined Patent Publication No. 326927/2003 and Japanese Unexamined Patent Publication No. 267012/2003). The method for utilizing the ($\mu$-s) property can also detect the simultaneous deflation of 4 wheels. Additionally, there is a method for enabling the detection of the deflation of 2 wheels at the same axis by comparing the rotational speed ratio of the front and rear wheels, with the rotational speed ratio of the front and rear wheels at normal air pressure, in running state in which a vehicle has no driving force (Japanese Unexamined Patent Publication No. 220811/2003), and a method for detecting the simultaneous deflation of 4 wheels.

SUMMARY OF THE INVENTION

However, since a conventional method using load sensitivity can judge only a case of cornering, the simultaneous deflation of 4 wheels cannot be detected until being state in which the car is cornering continuously for a time necessary for judgment. In the method for utilizing the ($\mu$-s) property, since the change of the ($\mu$-s) property is small and the gradient of curve of the ($\mu$-s) property is required to be calculated by regression calculation, a fixed time is required to analyze the data. Further, in the method for utilizing the rotational speed ratio of left and right wheels, the reduced pressure can be detected only in running state in which a vehicle has no driving force.

Accordingly, the purpose of the invention is to provide a deflation warning method and system for tires with reduced air pressure, and a judgment program of the reduced pressure of tires which detect further simply that the air pressures of 4 wheels are simultaneously reduced in running state in which a vehicle has driving force and even is not in cornering condition.

Originally, a method for comparing the rotational speed ratio of front and rear wheels before and after reduced pressure can detect the reduced pressures of two wheels at the same axis, but since the air pressures of front wheels and rear wheels are similarly reduced, it has been considered that the rotational speed ratio of front and rear wheels is not changed and the simultaneous deflation of 4 wheels cannot be detected by comparison of the rotational speed ratio. Further, it is considered that driving and braking force is an error factor in calculating the rotational speed ratio of front and rear wheels, and only data in the running state (idle running state) in which a vehicle has no driving force have been used in a conventional method.

However, when property in which the air pressures of wheels are reduced to lessen load sensitivity is applied, it was clarified that even if the air pressures of four wheels are simultaneously reduced, the rotational speed ratio of front and rear wheels at reduced pressure is changed in comparison with the rotational speed ratio of front and rear wheels at normal air pressure in the running state in which a vehicle has no driving force, excluding specific condition. Amplifying this further, there can be grasped the change of the rotational speed ratio of front and rear wheels at reduced pressure in comparison with the rotational speed ratio of front and rear wheels at normal air pressure in the running state in which a vehicle has a fixed driving force being not zero, and the simultaneous deflation of 4 wheels can be judged.

In this case, when air pressure is reduced, the ($\mu$-s) property of tires is changed and it is grasped that sliding is lessened; therefore the change of the rotational speed ratio of front and rear wheels at reduced pressure at the simultaneous deflation of 4 wheels is more enlarged by synergy effect with the lowering of load sensitivity by the reduced pressure.

In general, when the speed of a vehicle becomes faster, driving force for keeping the speed becomes larger. Accordingly, data (at normal or at the reduced pressure) of the running state in which a vehicle has a fixed driving force being not zero can be collected by collecting data of the rotational speed ratio of front and rear wheels at a fixed speed in high speed running to a certain degree. Further, it may be compared by collecting the rotational speed ratio of front and rear wheels at a fixed range of acceleration.

The tire deflation warning system of the present invention is a deflation warning system having a means for detecting the rotational speeds of wheels on a vehicle and a means for judging tires with reduced air pressure from the rotational speed information of the wheels includes a means for judging whether driving force works to respective wheels or not, a means for calculating a vehicle speed when driving force works to respective wheels, a means for comparing the average of the rotational speeds of the driving wheels against the average of the rotational speeds of the following wheels, with the average of the rotational speeds of the driving wheels against the average of the rotational speeds of the following wheels at normal air pressure in running state in which the vehicle has driving force and a means for judging that the air pressures of the all wheels which are mounted on the vehicle are simultaneously reduced, or that the air pressures of the driving wheels are reduced by the result of the comparison.

Further, the tire deflation warning system of the present invention is characterized in that the average of the rotational speeds of the driving wheels against the average of the rotational speeds of the following wheels at the normal air pressure is changed in accordance with the acceleration and deceleration of the vehicle.

According to the present invention, it can be detected that the air pressures of all wheels are simultaneously reduced or the simultaneous deflation of driving wheels can be detected from the rotational speed information of the wheel. Further, it can be judged in driving state and is not limited to at cornering. Since a time in running state having driving force is longer than a time in idle running state in the running of a vehicle (excluding a stoppage time), a time till detecting the reduced pressure can be shortened and precision of detection is improved.

Further, the gradient of curve of the (μ-s) property is not required to be calculated by the straight line of regression as a case of utilizing only the change of the (μ-s) property, and the reduced pressure can be easily and precisely judged.

DETAILED DESCRIPTION

Figure 1:
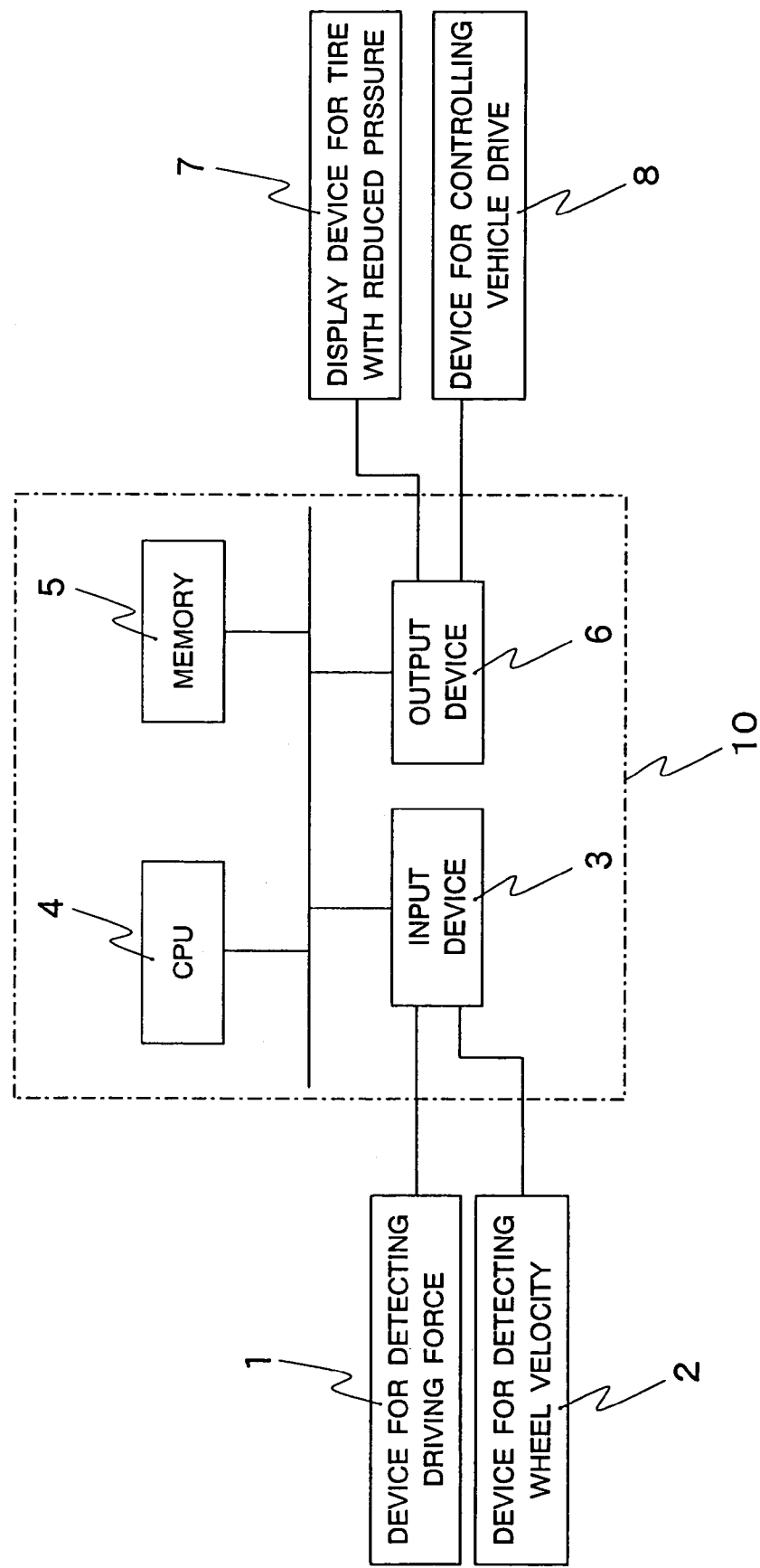
FIG. 1 is a block chart showing the composition of a device in Embodiment of the present invention.

The tire deflation warning system in the present invention is illustrated by referring to FIG. 1.

The tire deflation warning system 10 of the present Embodiment is connected with a means 2 for detecting the rotational speeds of respective wheels and connected with a display device 7 for alarming tires with reduced air pressure. Further, the tire deflation warning system is connected with a means 1 for detecting whether driving force works to wheels or not, for example, a detector of torque which is added to a driving axis or a detector by which accelerator operation can be easily carried out. The tire deflation warning system 10 is equipped with a computing device 4, a memory 5 of memorizing a program and computing data, a detecting device 1 of driving force and an input device inputting data from a detection device 2 for the rotational speeds of wheels, and an output device 6 outputting an alarm to the display device 7 of alarming tires with reduced air pressure. The speed of a vehicle may be also detected to be input in addition to the rotational speeds of wheels. Further, the alarming of tires with reduced air pressure may be output to other vehicle control device 8 and the like. Additionally, a reset switch for initializing data and a device inputting signals which shows the start-up of an engine are connected by consolidation of tires (not illustrated).

In the present Embodiment, it is described so that the judgment program of tires with reduced air pressure and data are memorized in the same memory, but the judgment program of tires with reduced air pressure may be memorized in a ROM (read only memory) and data may be memorized in a RAM (random access memory). The rotational speed ratio of the following wheels at normal air pressure is memorized in a RAM, but the memory portion is backed up by a non-volatile memory or a battery.

The principle of detecting the simultaneous deflation of 4 wheels of the present invention is illustrated below based on FIGS. 2 to 4.

Figure 2:
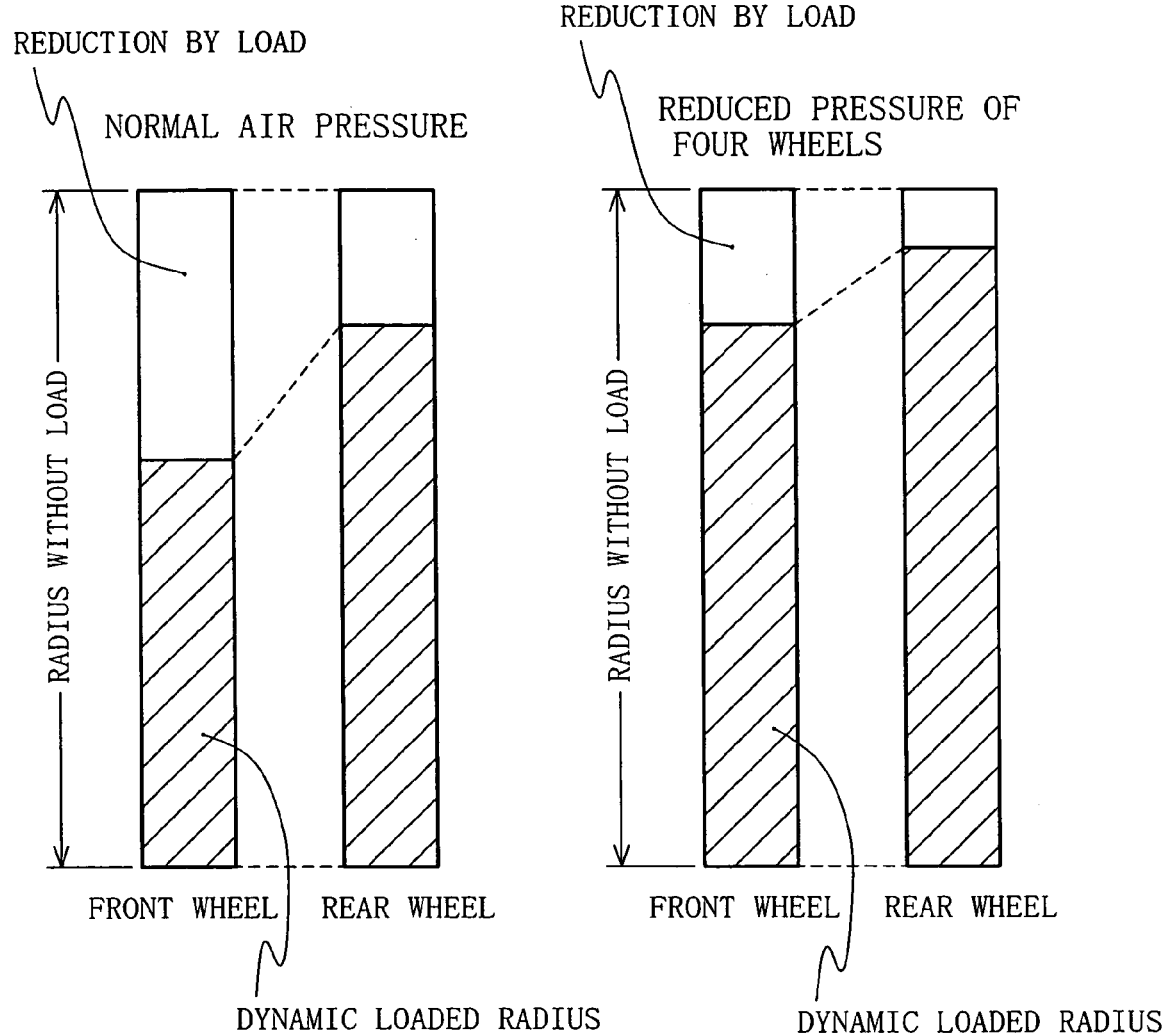
FIG. 2 is a chart showing the change of a dynamic loaded radius by a load by comparing that at normal air pressure with that at the reduced pressures of 4 wheels.

FIG. 2 is a chart showing the change of a dynamic loaded radius by a load in a front drive vehicle comparing that at normal air pressure with that at the reduced pressures of 4 wheels. The radii of tires are changed by loads. In a vehicle of front drive, the loads of front wheels are usually large, and since driving wheels are usually slipped during running, rotational angular velocities are larger than those of following wheels and the apparent radii of tires are lessened. However, when the air pressures of tires are decreased than normal, the difference of decrease of driving wheels and following wheels by loads is lessened (right side of FIG. 2, in the case of the reduced pressures of 4 wheels). Accordingly, the ratio of the dynamic loaded radii of front and rear wheels when the air pressures of 4 wheels are reduced (the dynamic loaded radii of driving wheels to the dynamic loaded radii of following wheels) is larger than the ratio of the dynamic loaded radii of front and rear wheels when air pressure is normal (the dynamic loaded radii of driving wheels to the dynamic loaded radii of following wheels). When a vehicle runs straightly, the circumferential velocities of tires are equal for 4 wheels; therefore to the contrary, the ratio of rotational speeds of front and rear wheels when the air pressures of 4 wheels are reduced is smaller than the ratio (the rotational speeds of driving wheels to the rotational speeds of following wheels) of rotational speeds (rotational angular velocity×the radius of tire) of front and rear wheels when air pressure is normal.

Figure 3:
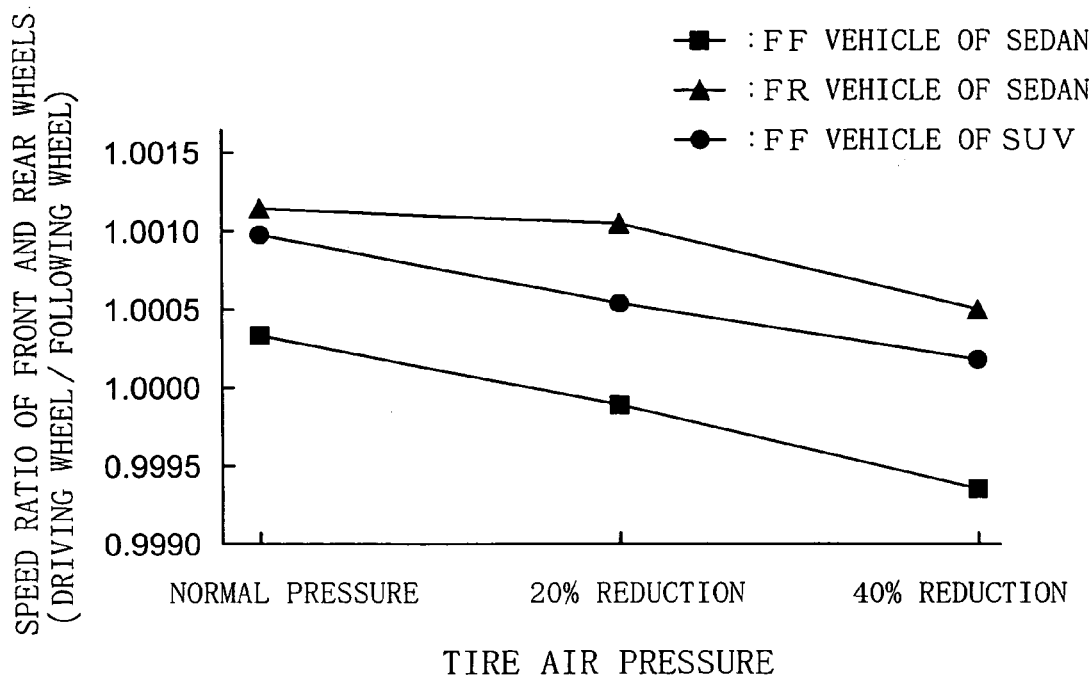
FIG. 3 is a graph showing relation between the reduced pressures of 4 wheels and the ratio of rotational speeds of front and rear wheels in the present invention.

FIG. 3 is a graph showing relation between the reduced pressures of 4 wheels and the ratio of rotational speeds of front and rear wheels (the average of the rotational speeds of driving wheels to the average of the rotational speeds of following wheels; hereinafter, abbreviated as the speed ratio of front and rear wheels). Hereat, the average of the rotational speeds of following wheels (or driving wheels) means that when the following wheels (or driving wheels) are 2 wheels, the sum of the rotational speeds of 2 of the following wheels (or driving wheels) is divided by 2. When the following wheel (or driving wheel) is one wheel, it means the rotational speed of one wheel. The speed ratio of front and rear wheels is decreased in accordance with the decrease of the air pressures of tires, in either of a FF car (an engine is set at front; front drive) of sedan, a FR car (an engine is set at front; rear drive) of sedan and a FF car SUV (Sport Utility Vehicle).

Consequently, when the speed ratio of front and rear wheels is lessened by a fixed value or more than the speed ratio of front and rear wheels at normal air pressure, it can be judged that the air pressures of 4 wheels are reduced. When the air pressures of 2 following wheels are reduced, the speed ratio of front and rear wheels is lessened; therefore the reduced pressures of 4 wheels and the reduced pressures of 2 following wheels cannot be distinguished. However, when they are compared at the same reduced pressure rate, the speed ratio of front and rear wheels of the reduced pressures of 4 wheels is large (which is close to normal); therefore the reduced pressure is judged by a threshold in case of the reduced pressures of 4 wheels, considering a safety side.

When the air pressures of 2 driving wheels are reduced, the dynamic loaded radii of following wheels are not changed, and the dynamic loaded radii of driving wheels are decreased than those at normal air pressure; therefore the speed ratio of front and rear wheels is larger than that at normal air pressure. Accordingly, when the speed ratio of front and rear wheels is larger by a fixed value than normal air pressure, it can be judged that the air pressures of 2 driving wheels are reduced.

When either of driving wheels or following wheels is one wheel, namely a vehicle with 3 wheels, the average of the rotational speeds of the fore-mentioned driving wheels or following wheels is the rotational speed of one wheel. In the fore-description, a case that the vehicle with 4 wheels is illustrated, but the reduced pressures of 3 wheels or the reduced pressures of driving wheels (2 wheels or one wheel) can be detected by applying the same principle even in case of a vehicle with 3 wheels. Further, a vehicle with 4 wheels is illustrated in the illustration below and Example, but a vehicle with 3 wheels can be also applied.

Figure 4:
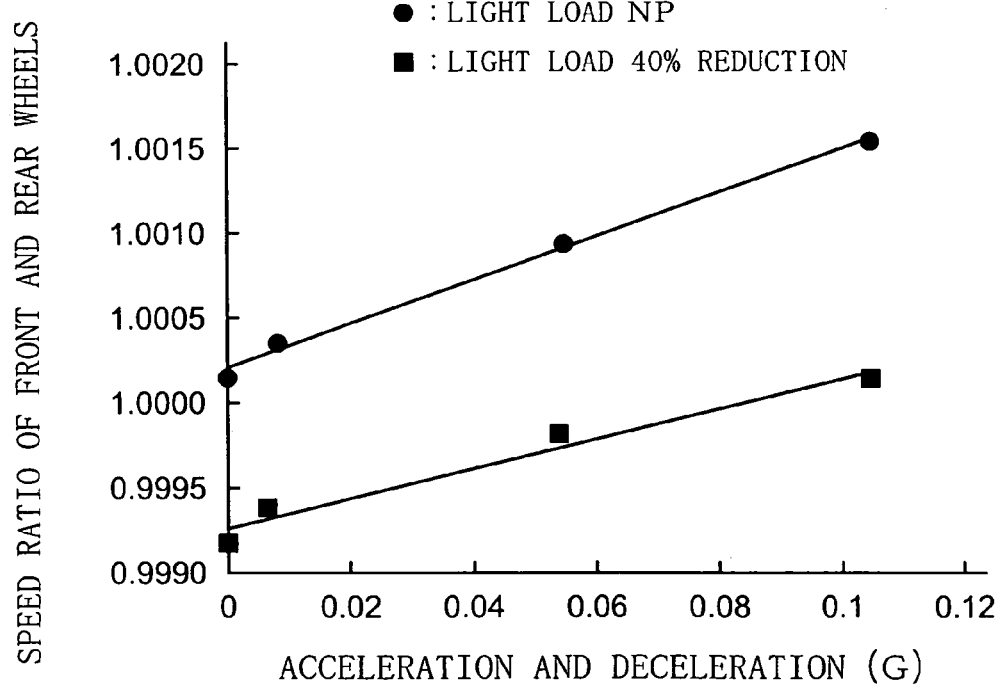
FIG. 4 is a graph showing example of relation between the acceleration and deceleration of a vehicle and the rotational speed ratio of front and rear wheels.

FIG. 4 is a graph showing one example of relation between the acceleration and deceleration of a vehicle and the speed ratio of front and rear wheels in case of a FF car of sedan. As described above, the speed ratio of front and rear wheels is lessened in case of the reduced pressures of 4 wheels in comparison with a case that the air pressures of tires are normal (the lower line of FIG. 4), but the speed ratio of front and rear wheels is enlarged in accordance with that the acceleration and deceleration (G) of a vehicle is enlarged, in either cases. This is caused by that when driving force is added, the dynamic loaded radius of driving wheels is lessened by slipping and the like. Further, the increase of the speed ratio of front and rear wheels by the increase of acceleration is large when the air pressures of tires are normal.

Then, the speed ratio of front and rear wheels at normal air pressure is changed in accordance with the acceleration and deceleration when the speed ratio of front and rear wheels during running is measured in order to judge the reduced pressures of 4 wheels or the reduced pressures of 2 driving wheels, and when it is compared with the speed ratio of front and rear wheels measured, it can be more accurately judged.

Figure 6:
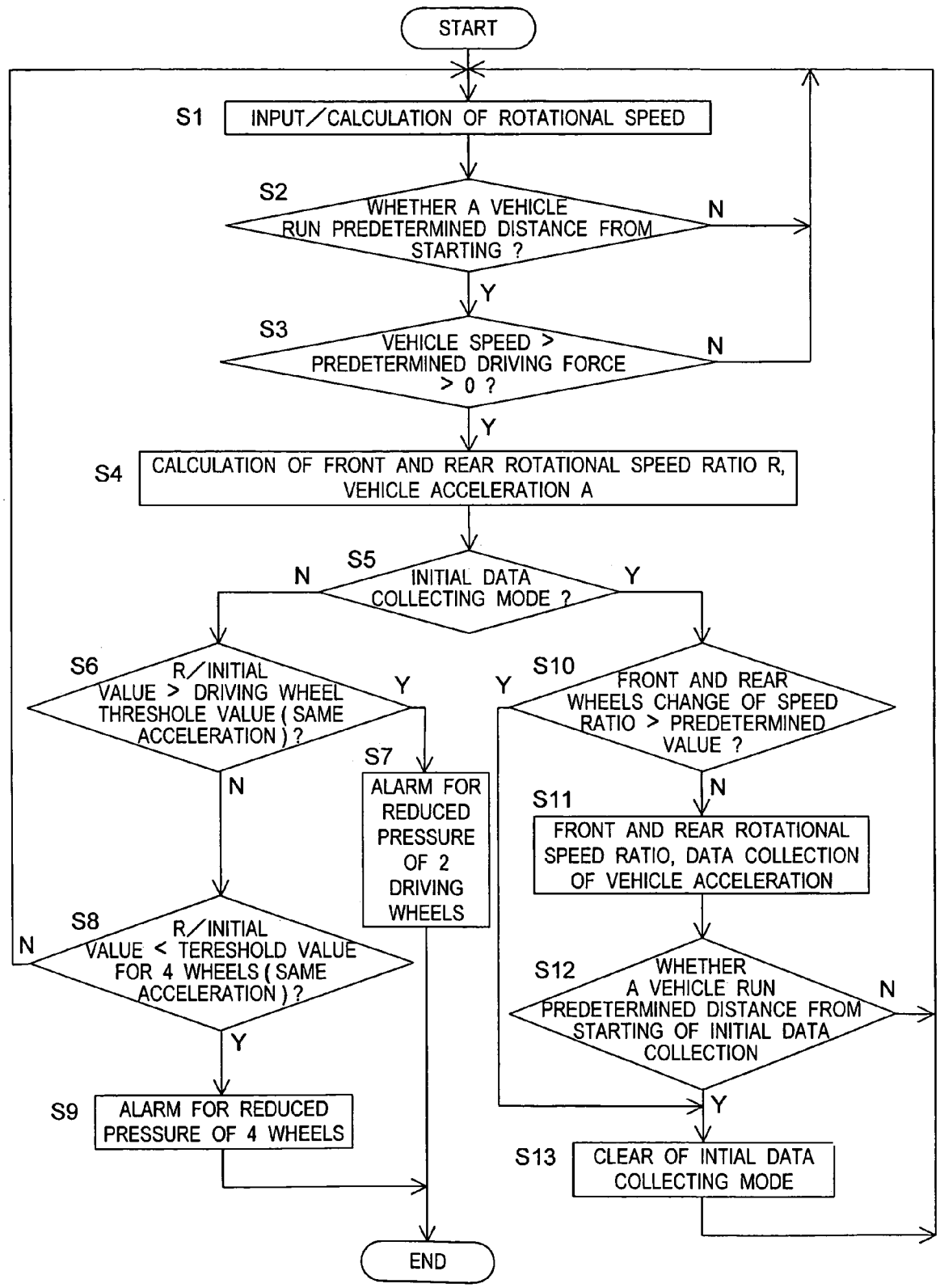
FIG. 6 is a flow chart judging the reduced pressures of tires in the Embodiment of the invention.

Then, the operation in Embodiment of the present invention is illustrated by referring to FIG. 6.

In a step different from the flow chart shown in FIG. 6, for example, when a tire is replaced or the rotation of tires is carried out, a mode collecting primitive data is occasionally set.

Data input command is sent to an input device at the step S1, and the rotational speed information of a wheel is downloaded to a memory. The rotational speed information is calculated by multiplying the rotational angular velocities of wheels by the radius of a tire. The rotational angular velocities of wheels may count pulses which are detected in accordance with the rotation of wheels, or may count the interval of pulses. Further, a measuring instrument in which output voltage is fluctuated in accordance with the rotational angular velocities of wheels may be used. At the same time, a distance from starting is integrated.

In the step S2, it is verified whether a vehicle run at a fixed distance from starting or not. When the running does not satisfy the fixed distance, judgment is not carried out.

In the step 3, it is arborized whether judgment below is carried out or not depending on whether the speed of a vehicle is more than a fixed value or not and whether driving force is positive or not. When the speed of a vehicle is more than a fixed value and the driving force is positive, the speed ratio of front and rear wheels and the acceleration of a vehicle of the step S4 are calculated.

If it is not a mode collecting initial data (can be deduced to be normal air pressure) (step S5), the speed ratio of front and rear wheels is compared with the initial (normal) speed ratio data of front and rear wheels (step S6). When the ratio (R/initial value) of the speed ratio of front and rear wheels (R) to the speed ratio of front and rear wheels at normal air pressure (initial value) is larger than the judging threshold of the reduced pressures of driving wheels which were preliminarily determined, it can be judged that the air pressures of the driving wheels are reduced; therefore the alarming of the reduced pressures of driving wheels is sent (step S7).

When it is judged by R/initial value that the air pressures of driving wheels are not reduced (step S8), the alarming of the reduced pressures of 4 wheels is sent (step S9) when R/initial value is smaller than the judging threshold of the reduced pressures of 4 wheels which were preliminarily determined. When the air pressures of driving wheels and 4 wheels are not reduced, motion returns to the step S1 and the input of the rotational speeds of wheels to judgment are repeated.

In case of the mode of collecting initial data, the step S10 is arborized from the step S5, the change of the speed ratio of front and rear wheels with a conventional value is examined and when the change is a fixed value or less, the speed ratio of front and rear wheels and the acceleration of a vehicle are added to data (step S11). The data collection averages, for example, the speed ratio of front and rear wheels thereto by every the acceleration of a vehicle.

When a fixed running distance is elapsed from reset which is set at the mode of collecting initial data (step S12), or when the fluctuation of the speed ratio of front and rear wheels is a fixed value or more (step S10), the mode of collecting initial data is unlocked.

The effect of the present invention is illustrated below based on a specific Example.

EXAMPLE

Vehicles used in the present Embodiment are Audi A4 (manufactured by Audi AG), Cedric (manufactured by Nissan Motor Co., Ltd.) and Odyssey (manufactured by Honda Motor Co., Ltd.).

Figure 5:
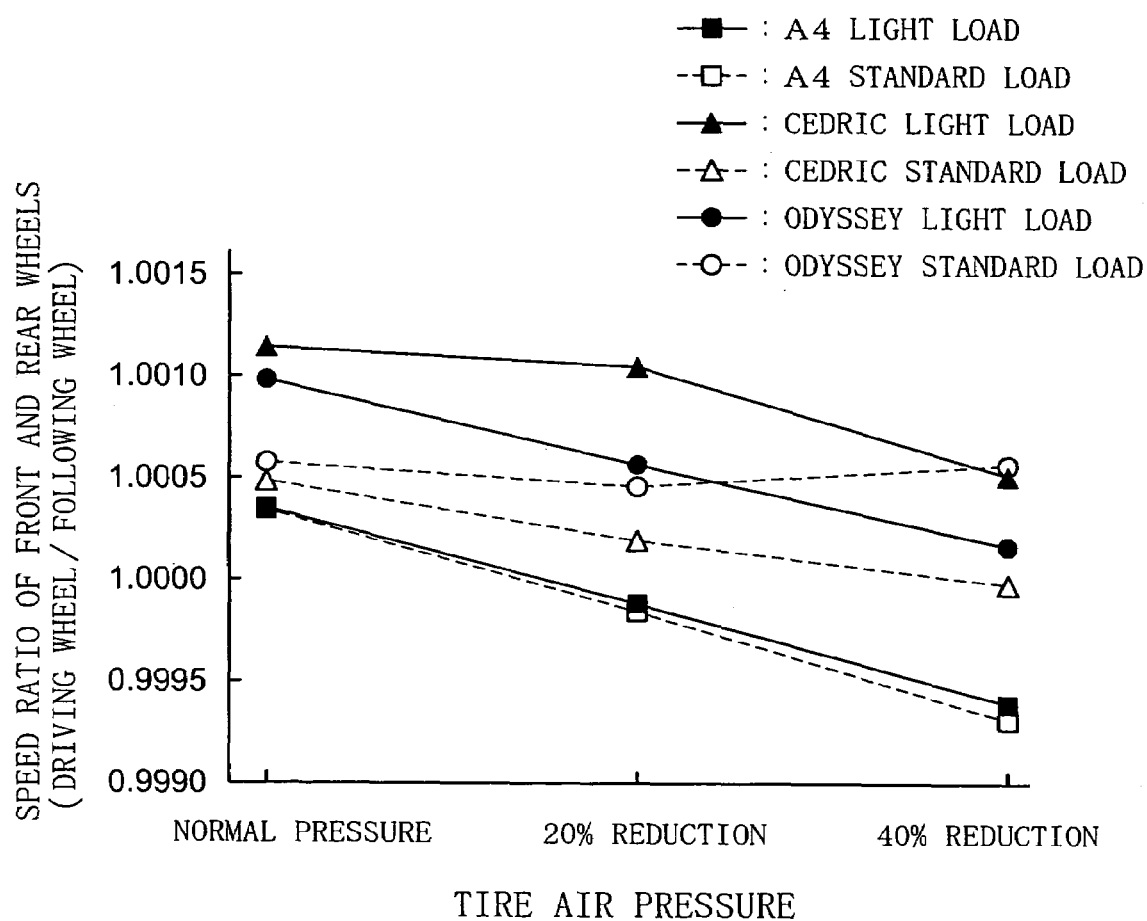
FIG. 5 is a graph showing the detection of the reduced pressures of 4 wheels by the reduced pressures of 4 wheels and the rotational speed ratio of front and rear wheels, in Example of the present invention.

The axis loads of 3 types of vehicles are shown in Table 1. FIG. 5 represents the speed ratios of front and rear wheels when the air pressures of 4 wheels in light load and standard load of 3 types of vehicles in Table 1 are normal, reduction of 20% and reduction of 40%.

TABLE 1

|  |  | Front axis (kg) | Rear axis (kg) |
|---|---|---|---|
| Audi A4 | Light load | 984 | 572 |
|  | Standard load | 995 | 743 |
| Cedric | Light load | 980 | 838 |
|  | Standard load | 1005 | 1054 |
| Odyssey | Light load | 1013 | 744 |
|  | Standard load | 1043 | 1004 |

Either decreases the speed ratio of front and rear wheels in accordance with the reduced pressures of 4 wheels excluding the standard load of Odyssey. In respective types of vehicles, the judgment of the reduced pressures of 4 wheels can be carried out, for example, by setting the value of the speed ratio of front and rear wheels of light load of reduction of 40% as the judging threshold.

What is claimed is:

1. A tire deflation warning system including a means for detecting rotational speeds of wheels on a vehicle having driving wheels and following wheels, for obtaining rotational speed information of the wheels, and a means for judging tires with reduced air pressure from the rotational speed information of the wheels, the system comprising:
   a means for determining whether (1) the vehicle has run a fixed distance from starting and (2) the speed of the vehicle is more than a fixed value;
   a means for judging whether driving force works to respective wheels or not;
   a means for calculating a vehicle speed when driving force works to respective wheels;
   a means for comparing (1) a ratio R of an average of the rotational speeds of the driving wheels against an average of the rotational speeds of the following wheels, in running state in which the vehicle has driving force, with (2) an initial value of an average of the rotational speeds of the driving wheels against an average of the rotational speeds of the following wheels at normal air pressure, in running state in which the vehicle has driving force, to obtain a ratio R/initial value; and
   a means for judging that the air pressures of the all wheels which are mounted on the vehicle are simultaneously reduced, or that the air pressures of the driving wheels are reduced by comparing the ratio R/initial value with (1) a preliminarily determined judging threshold for reduced pressures of all wheels or (2) a preliminarily determined judging threshold for reduced pressures of the driving wheels.

2. A tire deflation warning system according to claim 1, wherein the initial value is changed in accordance with acceleration and deceleration of the vehicle.

3. A judgment method for tires with reduced air pressure which judges tires with reduced air pressure using rotational speed information of wheels mounted on a vehicle having driving wheels and following wheels, the method comprising the steps of:
   determining whether (1) the vehicle has run a fixed distance from starting and (2) the speed of the vehicle is more than a fixed value;
   judging whether driving force works to respective wheels or not;
   calculating a vehicle speed when driving force works to respective wheels;
   comparing (1) a ratio R of an average of the rotational speeds of the driving wheels against the average of the rotational speeds of the following wheels, in running state in which the vehicle has driving force, with (2) an initial value of an average of the rotational speeds of the driving wheels against an average of the rotational speeds of the following wheels at normal air pressure, in running state in which the vehicle has driving force, to obtain a ratio R/initial value; and
   judging that the air pressures of the all wheels which are mounted on the vehicle are simultaneously reduced, or that the air pressures of the driving wheels are reduced by comparing the ratio R/initial value with (1) a preliminarily determined judging threshold for reduced pressures of all wheels or (2) a preliminarily determined judging threshold for reduced pressures of the driving wheels.

4. A judgment method for tires with reduced air pressure according to claim 3, wherein the initial value is changed in accordance with acceleration and deceleration of the vehicle.

5. A judgment program of the reduced pressures of tires for functionalizing a computer as a memory means of memorizing rotational speeds of wheels mounted on a vehicle having driving wheels and following wheels comprising;
   a means for determining whether (1) the vehicle has run a fixed distance from starting and (2) the speed of the vehicle is more than a fixed value;
   a means for judging whether driving force works to respective wheels or not;
   a means for calculating a vehicle speed when driving force works to respective wheels; and
   a means for detecting that the air pressures of the all wheels which are mounted on the vehicle are reduced, or that the air pressures of the driving wheels are reduced by comparing (1) a ratio R of an average of the rotational speeds of the driving wheels against the average of the rotational speeds of the following wheels, in running state in which the vehicle has driving force, with (2) an initial value of an average of the rotational speeds of the driving wheels against the average of the rotational speeds of the following wheels at normal air pressure, in running state in which the vehicle has driving force, in order to judge tires with reduced air pressure, to obtain a ratio R/initial value; and
   comparing the ratio R/initial value with (1) a preliminarily determined judging threshold for reduced pressures of all wheels or (2) a preliminarily determined judging threshold for reduced pressures of the driving wheels.

6. A judgment program of the reduced pressures of tires according to claim 5, wherein the initial value is changed in accordance with acceleration and deceleration of the vehicle.

* * * * *